United States Patent [19]

Süss et al.

[11] 4,205,950
[45] Jun. 3, 1980

[54] INJECTION MOLDING APPARATUS

[75] Inventors: Georg Süss, Vilsbiburg; Gerold Keil, Helmstedt, both of Fed. Rep. of Germany

[73] Assignee: Linde Aktiengesellschaft, Wiesbaden, Fed. Rep. of Germany

[21] Appl. No.: 907,627

[22] Filed: May 19, 1978

[30] Foreign Application Priority Data

May 21, 1977 [DE] Fed. Rep. of Germany ....... 2723071

[51] Int. Cl.$^2$ .......................... B29F 1/08; B29D 3/00
[52] U.S. Cl. ................................ 425/126 R; 264/237; 264/318; 425/129 R; 425/404; 425/548; 425/552; 425/575
[58] Field of Search ............... 425/533, 552, 575, 576, 425/126 R, 129 R, 190, 404, 547, 548; 264/318, 237

[56] References Cited

U.S. PATENT DOCUMENTS

| | | | |
|---|---|---|---|
| 3,712,786 | 1/1973 | Aoki | 264/318 X |
| 4,065,246 | 12/1977 | Marcus | 425/533 X |

Primary Examiner—Thomas P. Pavelko
Attorney, Agent, or Firm—Karl F. Ross

[57] ABSTRACT

Synthetic-resin articles are injection molded with at least one stationary mold cavity on the stationary mold plate being alternately aligned with carriers on the mold-closure plate so that each article is entrainable by this plate into a working station in which, for example, it can be cooled. During the injection molding of one article in the mold cavity defined between the stationary mold half and one of these carriers, a previously molded article is solidified on the other carrier in a working station offset from the stationary mold half. The newly injected mass is retained in the mold cavity only until the surface regions have cooled and set and the plate is then laterally shifted perpendicular to the mold closing direction to carry the article having the set surface regions and still fluid core into a working station while the other carrier, from which the cooled article has been ejected, is aligned with the stationary mold cavity.

9 Claims, 5 Drawing Figures

INJECTION MOLDING APPARATUS

FIELD OF THE INVENTION

The present invention relates to an apparatus for injection molding articles from a synthetic resin and, more particularly, to a system for the sequential production of injection-molded articles in an automatic injection molding machine.

BACKGROUND OF THE INVENTION

In an injection-molding process, a plastified mass of a synthetic resin material is introduced under pressure (injected) into a closed mold forming a mold cavity which is filled by the flowable mass of synthetic resin. The latter is customarily at a temperature above its plastic-flow temperature and generally above its melting point.

Upon cooling, the mold is opened and the article is ejected.

Injection molding systems of conventional types operate under a variety of modes.

For example, a predetermined quantity or dose of homogeneously melted or plastfied synthetic-resin material is injected under high pressure into a mold cavity which is complementary to the configuration of the article to be produced, i.e. is a negative of this article. The mold cavity is generally defined between two or more mold parts which are separate to allow release of the molded article and which are cooled.

The dose or quantity of the synthetic-resin material is a function of the volume of the mold cavity and is generally precisely dimensioned by introducing the necessary quantity of the material from an injection nozzle via an injection cylinder communicating with the mold cavity.

The injection cylinder is customarily provided with an injection piston which has a stroke sufficient to advance the mold material from the dosing chamber into the mold cavity.

As soon as the injection-molded material hardens by heat abstraction by the mold wall, i.e. by heat transfer to the latter, the mold cavity is opened and the molded article is ejected from the mold cavity. The mold is then closed and the process begins anew.

The cooling of an injection-molded article by heat transfer from the mold bodies through the mold wall of the cavity has been found to be relatively slow. Since the ejection of the injection-molded article from the mold cavity with the usual ejectors can only be effected when the injection molded article is hardened to its core, the heat transfer required for cooling the article must continue from the point of mold filling until the cooling has progressed sufficiently to allow such ejection.

Should the ejection force be applied to the molded article as long as the core is still soft, there is the danger that the article will be deformed in the region of the applied force, thereby rendering the article unusable and requiring its discard.

The working cycle of the injection molding machine is thus a function of the cooling time for the individual or successively produced articles.

Especially when thick-walled injection molded articles are to be produced, the cooling time per article can reduce the cycling time of the machine so that the capacity thereof is diminished below economical levels.

It is known to attempt to increase the cycling time of the machine by a forced cooling of the injection molded articles. However, the problem with this techniquie is that high-speed cooling of the injection-molded article, especially when it is large or formed from complex parts, can result in inhomogeneitus, stress regions and distortion zones because of thermal phenomena. The resulting reduction in the quality of the product causes the number of rejects to be large.

In fact, in practice, complicated-contour molded articles make use of heated molds or so-called hot-runner molds to insure the homogeneity of the injection-molded articles.

A process which involves the heating of the mold, the cooling of the mold and the subsequent reheating of the mold for the next cycle, increases the energy cost beyond economical or reasonable expectations and does not significantly reduce the cycling time of the machine.

OBJECTS OF THE INVENTION

It is the principal object of the present invention to provide a periodically operable system for injection molding over a long period of time a sequence of thermoplastic articles which is economical and enables a shortening in the cycling time of the machine.

It is also an object of the invention to provide an injection-molding machine which reduces the cycling time and has increased output.

It is still another object of the invention to provide an injection-molding system which can be operated more economically, with reduced cycling time and increased output.

Still a further object of the invention is to provide an apparatus for the production of thermoplastic injection molded articles which has a higher output of articles meeting close manufacturing tolerances, free from distortion and of a reduced reject rate.

SUMMARY OF THE INVENTION

These objects and others which will become apparent hereinafter are attained, in accordance with the present invention, by a system in which, after the cooling of the outermost contours or surface regions of the homogeneously molten injected synthetic resin material in the mold cavity beneath their flow limit or temperature, the mold cavity is opened, the injection-molded article is engaged by a transition device and is held thereby until the outermost contour of the injection molded article formed in the mold cavity in the next operation has been cooled below its flow limit in the same manner. The retaining (transition) device then can engage the newly formed injection molded article and can discharge (eject) the one previously held therein.

According to the invention, therefore, it is not necessary to delay the opening of the mold cavity until the injection-molded article has been fully hardened to its core.

Surprisingly, the opening of the mold need be delayed, in accordance with the system of the present invention, only until the outermost surface regions of the injection-molded article are cooled below the flow limit, i.e. the temperature at which autonomous plastic flow of the material can occur. The interior portions of the molded article can remain soft and practically flowable without thereby limiting the system of the present invention which makes use of the fact that the outer surface regions are sufficiently congealed, under the condition stated, that they constitute a practically rigid shell engageable without deformation by the transition device.

Thus, the injection-molded article after opening of the mold, can be engaged by a device which is capable of retaining the molded article with no undesired deformation thereof. For instance, this device can have a cavity or bed having the configuration of the molded article (i.e. generally a configuration complementary thereto), so that the internally still-soft injection-molded article is not subjected to distortion forces.

Specifically, the article-retaining device can be constituted with one of the mold halves previously forming the mold cavity.

In any event, the article is moved from the station in which it is formed to a station offset therefrom and can be displaced, according to the invention, relatively rapidly to allow re-closure of the mold. During the movement of the internally soft article, and while the latter is offset from the molding station, the article can be subjected to relatively cold ambient air. This promotes the cooling of the article to its core. In this case, heat is dissipated from the hardened wall or surface of the article and is transferred by conduction from the still soft interior to the surface at which the heat is dissipated by contact with the air. Naturally, where the article is in contact with a solid surface, it can be cooled further by the cooling of the coolant therethrough; only then do the ejectors discharge the article held by the retaining device.

Since the injection-molded article is retained in the device at least for a period sufficient to enable the outer periphery of the next article to be cooled below the flow limit, there is a sufficient degree of further cooling in this device that the article is ejected under the same conditions as have hitherto been common for ejection of a fully cooled article from the mold cavity. However, in this case, the ejection takes place from the intermediate retaining device.

Especially when thick-walled injection molded articles are produced, it has been found to be advantageous to promote the cooling of the article in the intermediate retaining device. To this end, means can be provided for contacting the injection molded article with a coolant. The cooling fluid, which can be a liquid, is applied at a rate corresponding to the wall thickness of the body to be cooled.

The use of a coolant serves to reduce the cycling time of the injection-molding machine still further since the mold itself need only pick up a lesser proportion of the heat from the injection molded article and thus can be opened in a shorter time for removal of the article and preparation to receive the next molded article.

Depending upon the size of the injection-molded article, the coolant can be selected to provide the desired cooling time for the injection molding cycle. In other words, the cooling time can be selected to correspond to the injection time by proper choice of the coolant.

It has been found to be desirable to use as the coolant a substance capable of abstracting large amounts of heat from the body contacted with the coolant. Preferably, the coolant is a liquefied deep-cooled gas, for example, applied in a liquid state to the body to be cooled. Naturally, the low temperature fluid can be applied in the gaseous state or as a mixture of gas and liquid, i.e. the type of mixture formed upon evaporation of a portion of the liquefied gas.

With thin-walled parts, the coolant can be water, atomized water, brine or air.

The use of a coolant in the manner described has been found to increase the operating rate of conventional injection molding machines and to make the operation thereof more economical.

The use of liquefied or deep-cooled gases for the augmented cooling of the injection molded articles allows, under certain circumstances, the resulting cold gases to be used for cooling the mold itself. The utilization of the liquefied gas is thus improved in such systems.

For the sequential but repetitive production of objects in which elements are embedded in the injection molded synthetic-resin material, i.e. wherein the embedded elements are metal inserts and the articles are switches and the like as may be used in the electrical or electronic industries, it has been found to be advantageous, after ejection of the molded article from the retaining device, to enable the retaining device to pick up the element to be inlaid or inserted into the molded article and to carry the same to the molding station for inclusion in the mold cavity. The working cycle of the injection molding machine even during the production of such molded articles can be reduced in this manner.

An apparatus for carrying out the method of the present invention comprises an injection-molding machine whose two (or more) part mold comprises an injection-side mold element and a closure-side element. Depending upon the shape of the body to be injection molded, the mold can also include a core. In the usual manner, the injection-mold element can comprise a fixed mold-carrying plate on the injection side of the apparatus while the closure-side mold member can be mounted on a mold carrying plate which is shiftable toward and away from the stationary mold-carrying plate. The injection-mold member can communicate via the injection nozzle with the injection molding machine (i.e. the injection unit) whereas the closure-side mold member can be provided with the ejectors.

According to the invention, the injection-side mold-carrying plate is formed with at least one mold cavity and at least two working or transition devices preferably disposed at the same height as the mold cavity and offset therefrom to opposite sides. The closure-side mold-carrier plate can include at least two closure-side molds.

After displacement of the movable mold-carrier plate away from the stationary mold-carrier plate, the movable mold-carrier plate can be laterally shiftable, i.e. shiftable in a direction transverse to its mold-closing direction, so that each closure cavity carrying a respective injection molded article which has been only surface cooled and solidified, is aligned with the receptacles formed by the treating stations and, upon re-advance of the mold-closure plate toward the stationary mold-carrying plate, an empty cavity of the mold-closure plate is aligned with and cooperates and mold cavities being disposed so that mold cavity which can be filled during the next cycle. During this cycle and upon displacement of the mold closing plate in the mold closing direction, therefore, the previously formed article is carried into one of the treating stations and can be subjected to high-efficiency cooling by jets of coolant trained thereon.

During the opening stage, while the slightly solidified injection molded article is withdrawn from the fixed mold cavity, chilled and further-cooled article simultaneously withdrawn from the treating station, can be ejected by operation of the ejector means which can include the core mentioned previously.

When this process is next repeated, the newly formed injection-molded article can be carried into the second treating station while a third article is produced in the now-closed mold cavity.

By the provision of at least two treating devices and at least two mold cavities on the movable mold-carrying plate, it is possible during cooling of one of the injection molded articles in the treating station to simultaneously injection mold another article in the closed mold which need only abstract a small degree of heat from this newly produced molded article.

Naturally, it is possible in this manner to simultaneously produce two types of injection-molded articles with injectable materials of different type or color if the stationary mold-carrying plate is formed with two fixed mold members each of which communicates with a respective extruder, the two extruders and mold cavities being disposed in this way that to either side of each of the stationary mold cavities a respective treating station can be provided.

According to yet another embodiment of the invention, two stationary mold cavities and three treating stations are provided, one of the treating stations being disposed between the stationary mold cavities while the other two treating stations flank the stationary mold cavities and are disposed outwardly therewith. In this embodiment, the distance (center to center) between each outer treating station and the proximal mold cavity of the stationary mold plate is equal to the distance between the central treating station and the two mold cavities on the latter. In this case, the movable mold plate can have two article-receiving stations and two molded articles can be formed simultaneously.

According to still another embodiment of the invention, for the simultaneous injection molding of two bodies of synthetic resin materials of different types or colors, two stationary mold cavities are provided on the injection-side mold-carrier plate and two working stations, i.e. a pair of working stations, can be provided to either side of the pair of stationary mold cavities. The movable mold-carrying plate need thus only be provided with four receptacles for the injection molded articles and can be shifted from side to side in the manner previously described.

According to still a further feature of the invention, each of the treating installations or stations is supplied with a cooling medium and serves as a cooling device. Naturally other combinations of the systems described can be used.

The cooling devices should be provided with an internal contour which corresponds substantially to the outer contour of the injection molded article, i.e. is of a complementary shape thereto but is spaced therefrom and is formed at a plurality of locations with spray nozzles for the cooling medium. The cooling medium can thus be distributed uniformly over the surface of the injection-molded articles to effect a particularly homogeneous cooling of these articles in a brief time.

Naturally, in the manner described previously, when embedded articles are to be produced, the treating stations can also be used to feed the elements to be embedded in the injection molding material to the movable mold plate so as to be carried thereby into the mold cavities. In this case, the treating stations can constitute feed devices for these articles.

When large injection molded bodies with embedded articles are to be made, it has been found to be advantageous to constitute the treating devices both as cooling units for the articles and as feed devices for the elements to be embedded in the synthetic resin material. In either case, the feed devices can be automatic and synchronized with the working cycle of the injection molding machine.

It has been found to be advantageous to use the principles of the present invention to make closure caps or covers for bottles, jars and the like. In this case, the injection molded article must have an internal thread. In the fabrication of such articles it is advantageous to provide the movable mold-carrying plate with a threaded core which can be provided with means for unscrewing the article after cooling so that the threaded core may also serve as the ejector means.

Advantageously, the closure side of the mold-carrying plate is provided with bores in which the threaded cores are rotatably journaled so that the cores can be shiftable with the mold-carrying plate. Naturally, the threaded cores can connect with the means for rotating same only in the working stations or treating stations, if desired, to enable the threaded cores to function as ejectors. Thus, when the closure caps are sufficiently cooled in the treating devices, the means for rotating the threaded cores can be operated to eject or dislodge the caps and enable them to fall from the mold.

To shift the closure-side mold-carrying plate laterally, the side of this plate turned away from the stationary mold-carrying plate can be guided on a carriage or support. The support itself can be displaceable toward and away from the stationary mold-carrying plate, i.e. in the mold-opening and mold-closing direction and can cooperate with limit switches or the like which operate electronically to enable cycling of the machine and to insure that the carrier will reach its end positions properly.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
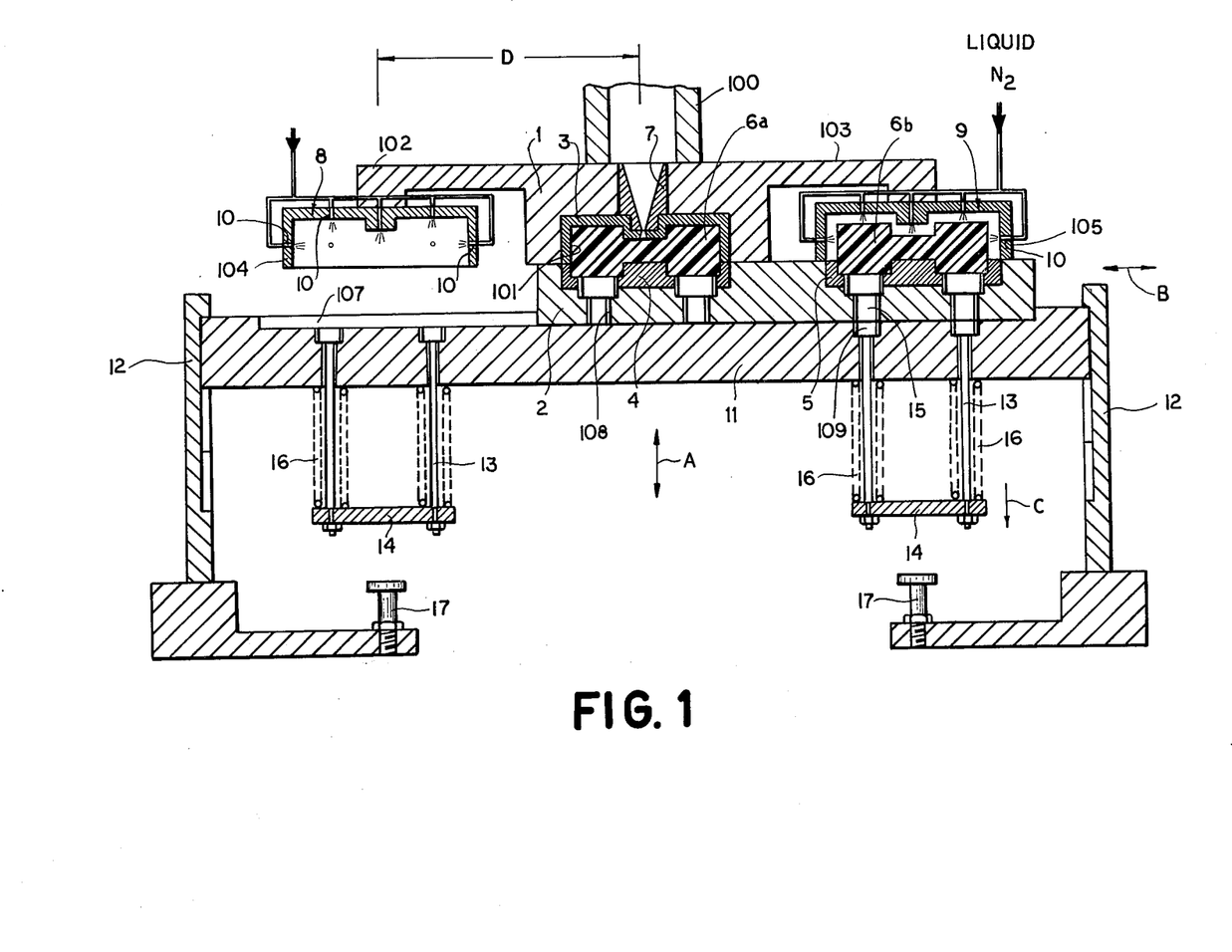
FIG. 1 is a diagrammatic cross-sectional view illustrating an embodiment of an injection molding machine according to the invention having two treating stations disposed on opposite sides of a fixed molding station on the fixed mold-carrying plate.

FIG. 1 shows an injection molding machine in which the injection cylinder is connected at 100 to an injection nozzle 7 of a stationary mold-carrying plate 1 which is formed centrally with a stationary injection mold half 3 defining a cavity 101 adapted to be filled with injection molding material, i.e. thermoplastic synthetic resin.

The mold cavity 101 is flanked by a pair of work stations represented generally at 8 and 9 such that the center-to-center distance D between each work station and the mold cavity 101 is equal to the corresponding distance between the other work station and the mold cavity.

In the embodiment illustrated, each of the work stations is formed on an arm 102, 103 of the stationary mold-carrying plate 1.

Each of the work stations 8, 9 comprises a shell 104, 105 adapted to receive the injection molded article, e.g. that shown at 6b, with a clearance to enable jets of a coolant to be introduced into the space and to contact the surfaces of the molded body. To this end, the shell is formed with spray nozzles 10 which are distributed over the entire surface of the shell and train respective jets of the coolant against juxtaposed surfaces of the injection molded article.

Preferably, the shell 104, 105 is complementary to the configuration of the injection molded article although it is somewhat larger, to provide a clearance. In other words, the surface of the shell 104, 105 is geometrically similar to the outer surface of the injection-molded article to be received therein.

The injection-molding machine thus comprises a pair of work stations 8 and 9 at the same level as the stationary mold half 3 but equispaced therefrom. The shells 104 and 105 can be constituted as cooling masks.

The mold-carrying plate on the mold-closing side of the machine is shiftable toward and away from the stationary plate (arrow A) by means not shown but conventional in the art. Such means can include hydraulic piston-and-cylinder arrangements capable of developing the necessary mold-closing force.

The mold-carrying plate 2 comprises a pair of closeable mold halves represented at 4 and 5 whose center-to-center distance is equal to the center-to-center distance D previously mentioned.

On its side turned away from the stationary plate 1, the plate 2 is guided laterally (arrow B) on a carrier 11 which, in turn is shiftable in the closing direction A in the usual guide or support elements 12. The guide or support elements 12 thus form a track for the mold plate which is perpendicular to the track 107 formed by the carrier 11 for the plate 2 in the direction of arrow B.

Limit switches Sw can control the movement of the plate 2 relative to the carrier 11 laterally and corresponding limit switches may control the reciprocation of the carrier 11 on the guides 12.

The limit switches thus insure that the mold halves 4 and 5 are always properly aligned or in registry with the stationary mold half 3 or the working stations 8 and 9.

Indexing means can be provided for indexing both the carrier 11 and the plate 2 in the limiting or end positions thereof.

The drive means for the plate 2 and the carrier 11 can be, in addition to the hydraulic system previously described, chain drives, belt drives, rack and pinion drives, screw drives or the like. Such drive systems are well known in the art and need not be described in greater detail hereinbelow.

An ejection system is formed by a pair of ejector pins 15 which are carried by rode 13 interconnected by a yoke 14 engages an adjustable stop 17 on the downward movement of the plate 11, the pins 15 are driven upwardly to eject the article 6b.

The pins 15 are slideable in respective bores 108 of the mold plate 2 and come into alignment with heads 109 at the ends of the rods 13 when the mold halves 4 and 5 are disposed in one of the working stations.

The operating sequence is as follows:

Assume that the plate 11 and the plate 2 are in the position shown in FIG. 1 and a mass of injection-moldable material 6a has been introduced into the mold cavity 101 defined between the mold halves 3 and 4. During this molding operation, a previously formed article 6b is disposed in the working station 9.

While the surface of the article 6a is consolidating and cooling to form a superficial hardened shell, the article 6b is subjected to intensive cooling by jets of liquefied gas introduced via the nozzles 10.

When the article 6a has been superficially cooled, the carrier 11 is drawn downwardly (arrow A) until the yoke 14 strikes the right hand stop 17, thereby ejecting the molded article 6b. The ejection rods 13 are then retracted by spring 16 upon advance upwardly of the plate 11 while the plate 2 shifts to the left. As mold closing is completed, the mold half 5 is in registry with mold half 3 to define a new mold cavity while the article 6a is located in the working station 8.

A new mass of plastic material is injected into the closed mold cavity while jets 10 direct the liquefied gas coolant against the article 6a.

When the surface of the newly injected body in the empty mold cavity is cooled sufficiently to solidity only the surface zones, the carrier 11 is again retracted, the ejector pins 13, 15 at the left hand station eject the article 6a, the plate 2 shifts to the position shown in FIG. 1 and the mold is again closed for repetition of the cycle.

Figure 2:
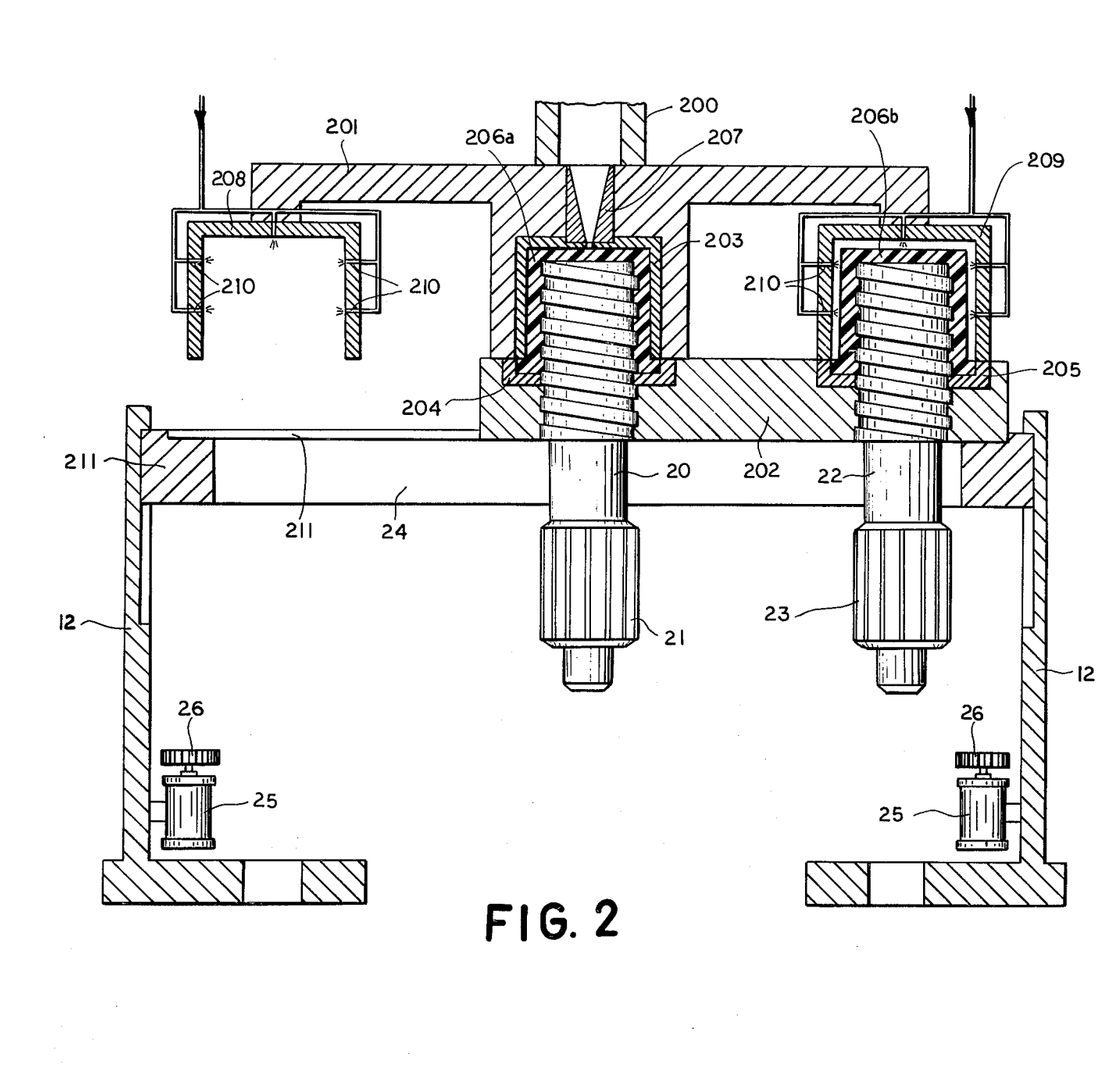
FIG. 2 is a cross-sectional view through another injection molding machine according to the invention for producing internally-threaded caps and in which the treating stations function as cooling stations for the caps.

In the system illustrated in FIG. 2, the stationary mold plate 201 is formed with a stationary mold cavity 203 having the configuration of the exterior of a screw cap. A nozzle 207 delivers the moldable material from an injection cylinder 200.

The plate 201 carries, at the same level as the mold cavity 203, a pair of cooling masks 208, 209 forming work stations equivalent to those described in connection with FIG. 1 and provided with coolant nozzles 210.

In this embodiment, the mold plate 202 is formed with a pair of mold halves 204, 205 whose center-to-center spacing is equal to the center-to-center spacing between the stationary mold cavity 203 and each of the work stations 208, 209. In this embodiment, however, a core is formed by a threaded mandrel 20, 22 which is provided with gearing 21, 23 below the plate 202 for engagement by a drive (not shown) serving to eject the molded article 206a or 206b.

The plate 202 is laterally shiftable on a carrier 211 which is formed with a slot 24 enabling the cores 20 and 22 to be entrained with the plate 202.

The system of FIG. 2 operates in a manner similar to that of the system of FIG. 1 except that the ejection of the cooled cap 206b is effected by retracting the plate 11 until the gearing 23 of the threaded core 22 engages the gear 26 of a motor 25. The latter is then driven to spin off the cap 206b. After ejection of the cap 206b, the core 22 is brought back into its starting position by reverse rotation. The plate 202 is displaced to the left and the process repeated, i.e. a new cap is injection molded in the closed cavity formed between the mold halves 203, 205 while the body 206a is cooled in station 208.

Naturally, instead of a linearly reciprocal plate 202, the latter can form part of a turntable of arcuate-displacement unit so that the various mold halves 204, 205 are successively aligned with mold cavities 203 and working stations 208 or 209 upon angular displacement or indexing of the plate.

Instead of gearing 21, 23 on the screw cores 21, 22, they can be coupled to the ejector drives by belts, friction wheels, V-belts or the like.

Such belt drives can be engaged or disengaged by tensioning or detensioning, respectively, as required.

Figure 3A:
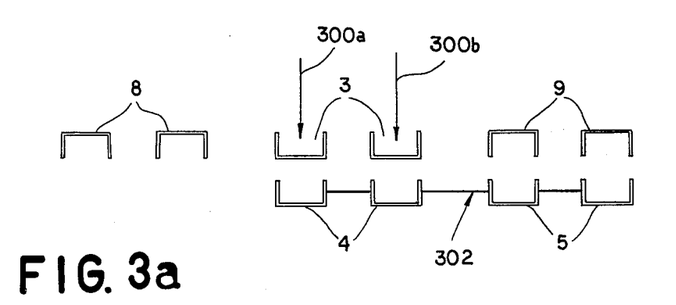
FIGS. 3a and 3b are diagrams illustrating two other embodiments of machines according to the invention.

In FIG. 3a we show, diagrammatically, an injection molding apparatus which comprises two injection-molding assemblies each including a respective injection cylinder as represented at 300a and 300b, feeding a respective mold half 3 which can be aligned with paired mold halves 4 or paired mold halves 5, both pairs of movable mold halves being carried on a common plate 302.

In the embodiment of FIG. 3a, therefore, to each side of the stationary mold halves 3, there are provided a respective pair of working stations 8 or 9.

In operation, therefore, with the plate 302 in the position illustrated in FIG. 3a, the injection molding cylinders 300a and 300b, which can operate with injection-molding materials of different type or color, can produce respective molded bodies using the mold halves 4 which are in registry therewith. While the surface regions of these molded articles are cooled to render them mechanically stable, previously formed molded articles carried by the mold halves 5 are chilled or further cooled in the working stations 9.

Upon retraction of the carrier for plate 302, ejection of the molded articles from mold halves 5 and shifting of the plate 302 to the left, the previously mentioned, newly molded articles are cooled in the working station 8 while new articles are formed in the injection molds defined between the mold halves 3 and the registering mold halves 5.

Figure 3B:
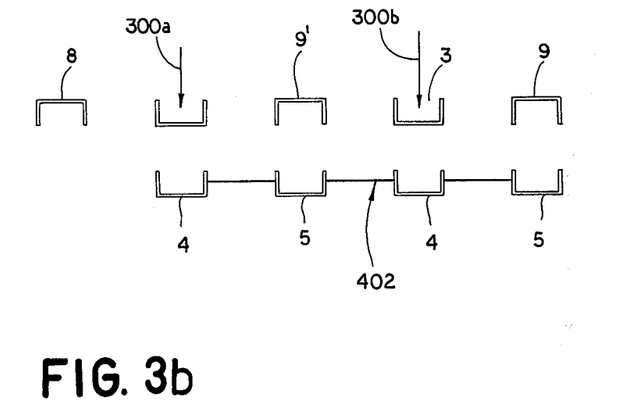

Still another system allowing a plurality of molded articles to be produced during each cycle, has been shown in FIG. 3b which requires only three working stations. In this embodiment, the outer working stations are represented at 8 and 9, respectively, while a central working station is shown at 9'. The center to center distances between the working stations and the stationary mold halves 3 are all equal in this embodiment as well. Each of the mold halves 3 can cooperate with a respective conventional molding cylinder 300a, 300b for material of different composition or color.

In this embodiment, however, the laterally shiftable mold plate 402 is provided with the mold halves 4 and 5 in alternating relationship. The mold plate 402 here need only be shifted by a distance equal to the center-to-center distance mentioned previously.

When the mold plate 402 closes against the stationary mold plate, articles can be formed in the mold cavities defined between the stationary molds 3 and the mold halves 4 while previously molded articles are cooled in the working stations 9 and 9', being carried by the mold halves 5.

Upon retraction of the plate 402, the articles are rejected from the mold halves 5 and the plate can be shifted to the left so that new articles are formed in the closed molds defined between the mold halves 3 and 5. The previously formed injection molded articles are, of course, cooled in the working stations 8 and 9'.

Figure 4:
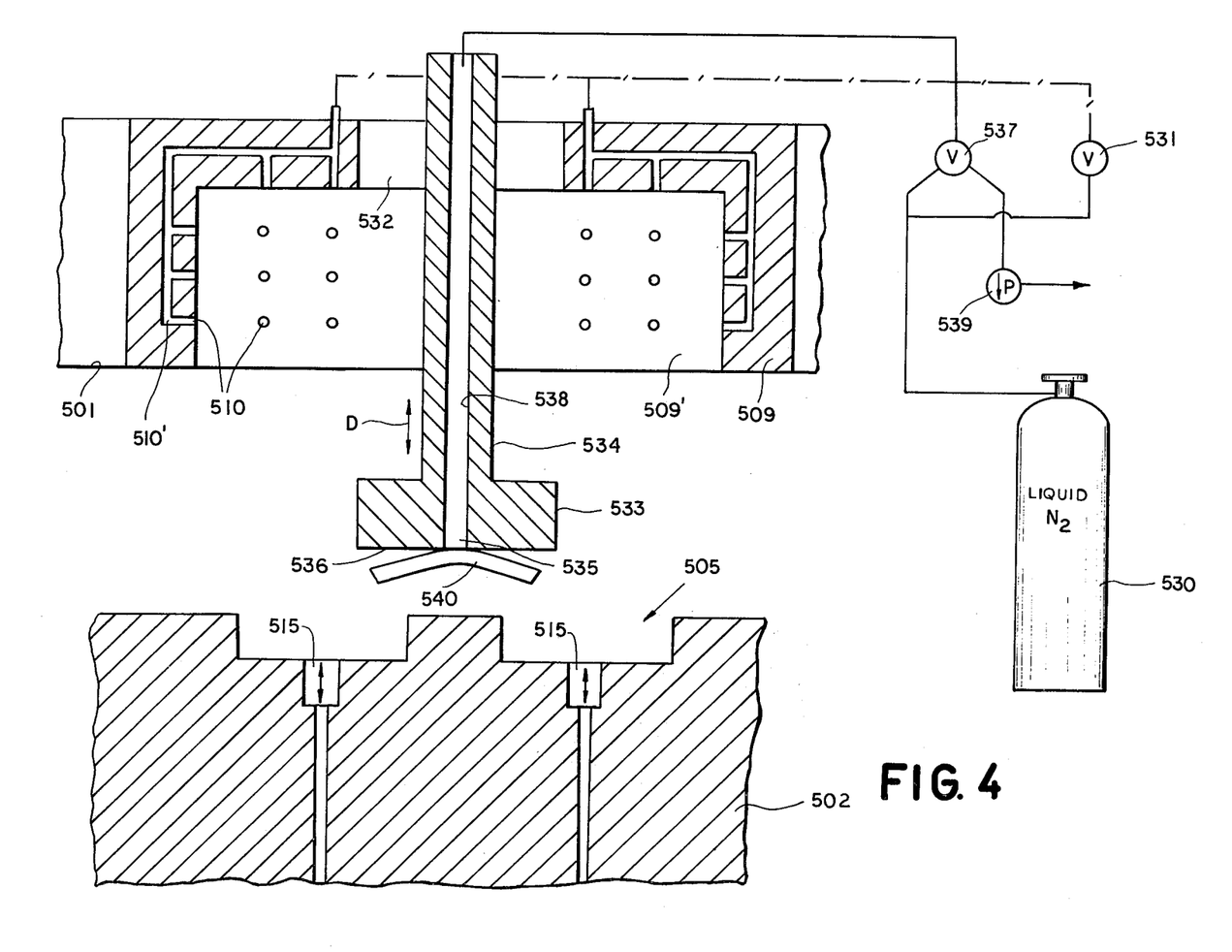
FIG. 4 is a cross-sectional view of another machine embodying the invention, showing only the treating stations thereof.

In FIG. 4, we have shown a working station in which the cooling mask 509 is formed with the passages 510' which communicate with the nozzles 510 whereby a liquefied gas coolant, e.g. liquid nitrogen from a bottle 530, can be sprayed onto the injection molded article which is advanced into the chamber 509' enclosed by the mask 509.

A valve 531 enables the liquid nitrogen to be admitted into the chamber 509' only when the mold plate 502 has carried the molded article into the latter.

The mask 509 is here afixed laterally to an arm 501 of the stationary mold plate and is formed with a central opening 532 adapted to receive a plug 533 carried on a tubular shank 534 and displaceable in the direction of the arrow D. The tubular shank 534 communicates via a port 535 at the face of the plug 533 illustrated at 536 so that liquid coolant from a distributing valve 537 can be introduced into the chamber 509'. The valve 537 can also selectively connect the central bore 538 of the shank 534 with a suction pump 539 so that the member 533, 534 can pick up an insert 540 adapted to be embedded in the synthetic resin article.

The plate 502 can be formed with the ejector pins 515 which may operate as described in connection with FIG. 1.

The plate 502 is shown in its retracted position, i.e. its carrier has been displaced away from the stationary mold plate and the previously molded article, after cooling, has been ejected and the pins 515 have been reset in the plate 502. In this position of plate 502, the device 533, 534 can be advanced in through the opening 532 to deposit the insert 540 to be embedded in the synthetic resin material onto the mold member 505 formed on the plate 502. Thus the device 533, 534 constitutes feed means for placing inserts upon the mold members 505 so that these inserts may be ultimately embedded in the synthetic resin material when the mold cavities 505 are aligned with the stationary mold cavities of the stationary plate.

We claim:

1. An injection molding apparatus comprising
   a stationary mold plate formed with a stationary mold element adapted to define a mold cavity;
   injection means communicating with said mold cavity through said stationary mold element for injecting a mass of synthetic-resin material into said mold cavity to form an injection-molded article;
   a movable mold plate displaceable toward and away from said stationary mold plate for mold-closing and mold-opening operation, said movable mold plate being formed with at least two sapced-apart movable mold elements each defining said mold cavity with said stationary mold element upon registry of the respective movable mold element therewith and advance of said movable plate in the mold-closing direction, said plates being further relatively shiftable to register each of said movable mold elements with said stationary mold elements alternately;
   a pair of work stations each adapted to receive a said article carried in one of said movable mold elements upon displacement of said movable plate in said mold-closing direction when the other movable mold element defines said mold cavity with said stationary mold element the work station being provided with an internal contour which corresponds substantially to the outer contour of the injection molded article but is spaced therefrom forming a cavity between said injection molded article and said work station;
   means to inject a coolant into said cavity
   means for retaining a mass in said mold cavity substantially only for a period sufficient to cool the surface regions of said mass to a temperature below the flow temperature thereof and then removing the resulting article from said cavity and transporting same into one of said working stations offset from said mold cavity while ejecting said previously formed article from its working station and simultaneously with the introduction of the article formed from said mass into one of said working stations, closing said mold cavity and injecting another mass of synthetic-resin material therein.

2. The apparatus defined in claim 1 wherein the means to inject a coolant comprises nozzles for training jets of said coolant onto said article.

3. The apparatus defined in claim 1 wherein at least one of said working stations is formed with means for feeding inserts to be embedded in the synthetic-resin material onto said movable mold elements.

4. The apparatus defined in claim 1 wherein the movable and stationary mold elements define a mold cavity having the configuration of a closure cap, said movable plate being provided with an externally threaded core at each of said movable mold elements to form internal threads for said closure caps.

5. The apparatus defined in claim 4 wherein said cores are rotatable in said movable plate and are formed with means engageable to rotate said cores and discharge said caps from said movable mold elements.

6. The apparatus defined in claim 1 wherein said movable plate is shiftable transversely to the mold-closing direction on a carrier, said carrier being displaceable in said mold-closing direction.

7. The apparatus defined in claim 6, further comprising limit switches controlling the displacement of said plate on movable said carrier and the displacement of said carrier.

8. The apparatus defined in claim 6, further comprising ejector means on said carrier opposite said working stations and cooperating with said plates for dislodging articles cooled in said working station from said movable mold elements.

9. The apparatus defined in claim 8 wherein each of said working stations includes a mask adapted to receive said articles, and nozzle means in each of said masks for directing jets of liquefied gas against an article disposed in the respective mask.

* * * * *